(12) United States Patent
Mitchell et al.

(10) Patent No.: US 11,080,042 B2
(45) Date of Patent: Aug. 3, 2021

(54) SECURE APPLICATION DISTRIBUTION SYSTEMS AND METHODS

(71) Applicant: Intertrust Technologies Corporation, Sunnyvale, CA (US)

(72) Inventors: Stephen G. Mitchell, Ben Lomond, CA (US); Gilles Boccon-Gibod, San Francisco, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 124 days.

(21) Appl. No.: 15/660,201

(22) Filed: Jul. 26, 2017

(65) Prior Publication Data

US 2017/0322800 A1 Nov. 9, 2017

Related U.S. Application Data

(63) Continuation of application No. 14/935,230, filed on Nov. 6, 2015, now abandoned.

(60) Provisional application No. 62/076,354, filed on Nov. 6, 2014.

(51) Int. Cl.
*G06F 8/60* (2018.01)
*G06F 8/71* (2018.01)
*G06F 21/12* (2013.01)
*H04W 4/60* (2018.01)

(52) U.S. Cl.
CPC .............. *G06F 8/71* (2013.01); *G06F 8/60* (2013.01); *G06F 21/125* (2013.01); *H04W 4/60* (2018.02)

(58) Field of Classification Search
CPC ............ G06F 21/125; G06F 8/60; G06F 8/71; H04W 4/60
See application file for complete search history.

(56) References Cited

U.S. PATENT DOCUMENTS

| | | | |
|---|---|---|---|
| 5,249,294 A | 9/1993 | Griffin, III et al. | |
| 5,287,407 A | 2/1994 | Holmes | |
| 5,339,426 A | 8/1994 | Aoshima | |
| 5,530,235 A | 6/1996 | Stefik et al. | |
| 5,534,975 A | 7/1996 | Stefik et al. | |
| 5,535,329 A | 7/1996 | Hastings | |
| 5,629,980 A | 5/1997 | Stefik et al. | |

(Continued)

FOREIGN PATENT DOCUMENTS

| | | |
|---|---|---|
| EP | 0 715 247 A1 | 6/1996 |
| WO | WO 99/64973 A1 | 12/1999 |

OTHER PUBLICATIONS

US 5,748,741 A, 05/1998, Johnson et al. (withdrawn)

(Continued)

*Primary Examiner* — Wei Y Zhen
*Assistant Examiner* — Amir Soltanzadeh
(74) *Attorney, Agent, or Firm* — Finnegan, Henderson, Farabow, Garrett & Dunner, LLP (57) ABSTRACT

Systems and methods are described that use software diversification techniques to improve the security of mobile applications. Embodiments of the disclosed systems and methods may, among other things, facilitate secure application distribution through deployment of diverse of applications in an application distribution channel. Software diversification consistent with certain disclosed embodiments may mitigate large-scale automated circumvention of security protections by presenting attacking malware moving and/or otherwise unpredictable diverse targets.

10 Claims, 8 Drawing Sheets

(56) References Cited

U.S. PATENT DOCUMENTS

| | | |
|---|---|---|
| 5,634,012 A | 5/1997 | Stefik et al. |
| 5,638,443 A | 6/1997 | Stefik et al. |
| 5,664,018 A | 9/1997 | Leighton |
| 5,701,452 A | 12/1997 | Siefert |
| 5,715,403 A | 2/1998 | Stefik |
| 5,745,569 A | 4/1998 | Moskowitz et al. |
| 5,892,899 A | 4/1999 | Aucsmith et al. |
| 5,892,900 A | 4/1999 | Ginter et al. |
| 5,915,027 A | 6/1999 | Cox et al. |
| 5,920,861 A | 7/1999 | Hall et al. |
| 5,930,768 A | 7/1999 | Hooban |
| 5,933,498 A | 8/1999 | Schneck et al. |
| 5,943,422 A | 8/1999 | Van Wie et al. |
| 5,949,885 A | 9/1999 | Leighton |
| 6,006,328 A | 12/1999 | Drake |
| 6,044,155 A | 3/2000 | Thomlinson et al. |
| 6,047,374 A | 4/2000 | Barton |
| 6,055,503 A | 4/2000 | Horstmann |
| 6,085,249 A | 7/2000 | Wang et al. |
| 6,088,452 A | 7/2000 | Johnson et al. |
| 6,088,814 A | 7/2000 | McKenzie et al. |
| 6,101,605 A | 8/2000 | Buer |
| 6,119,230 A | 9/2000 | Carter |
| 6,138,119 A | 10/2000 | Hall et al. |
| 6,157,721 A | 12/2000 | Shear et al. |
| 6,167,358 A | 12/2000 | Othmer et al. |
| 6,185,312 B1 | 2/2001 | Nakamura et al. |
| 6,185,683 B1 | 2/2001 | Ginter et al. |
| 6,192,475 B1 | 2/2001 | Wallace |
| 6,233,684 B1 | 5/2001 | Stefik et al. |
| 6,243,480 B1 | 6/2001 | Zhao et al. |
| 6,246,775 B1 | 6/2001 | Nakamura et al. |
| 6,259,801 B1 | 7/2001 | Wakasu |
| 6,263,493 B1 | 7/2001 | Ehrman |
| 6,266,299 B1 | 7/2001 | Oshima et al. |
| 6,266,654 B1 | 7/2001 | Schull |
| 6,272,634 B1 | 8/2001 | Tewfik et al. |
| 6,285,776 B1 | 9/2001 | Rhoads |
| 6,317,834 B1 | 11/2001 | Gennaro et al. |
| 6,345,104 B1 | 2/2002 | Rhoads |
| 6,351,837 B1 | 2/2002 | Huang et al. |
| 6,363,486 B1 | 3/2002 | Knapton, III |
| 6,385,603 B1 | 5/2002 | Chen et al. |
| 6,425,081 B1 | 6/2002 | Iwamura |
| 6,415,041 B1 | 7/2002 | Oami et al. |
| 6,442,284 B1 | 8/2002 | Gustafson et al. |
| 6,449,377 B1 | 9/2002 | Rhoads |
| 6,499,137 B1 | 12/2002 | Hunt |
| 6,504,941 B2 | 1/2003 | Wong |
| 6,513,118 B1 | 1/2003 | Iwamura |
| 6,522,766 B1 | 2/2003 | Ratnakar |
| 6,522,767 B1 | 2/2003 | Moskowitz et al. |
| 6,522,770 B1 | 2/2003 | Seder et al. |
| 6,546,505 B1 | 4/2003 | Swoboda et al. |
| 6,549,638 B2 | 4/2003 | Davis et al. |
| 6,553,129 B1 | 4/2003 | Rhoads |
| 6,553,497 B1 | 4/2003 | Challener et al. |
| 6,590,995 B1 | 7/2003 | Schwenk et al. |
| 6,594,761 B1 | 7/2003 | Chow et al. |
| 6,611,607 B1 | 8/2003 | Davis et al. |
| 6,614,914 B1 | 9/2003 | Rhoads et al. |
| 6,636,615 B1 | 10/2003 | Rhoads et al. |
| 6,650,761 B1 | 11/2003 | Rodriguez et al. |
| 6,665,419 B1 | 12/2003 | Oami |
| 6,668,325 B1 | 12/2003 | Collberg et al. |
| 6,683,546 B1 | 1/2004 | Torrubia-Saez |
| 6,728,390 B2 | 4/2004 | Rhoads et al. |
| 6,744,906 B2 | 6/2004 | Rhoads et al. |
| 6,754,822 B1 | 6/2004 | Zhao |
| 6,779,114 B1 | 8/2004 | Chow et al. |
| 6,785,399 B2 | 8/2004 | Fujihara |
| 6,785,815 B1 | 8/2004 | Serret-Avila et al. |
| 6,801,999 B1 | 10/2004 | Venkatesan et al. |
| 6,807,634 B1 | 10/2004 | Braudaway et al. |
| 6,829,710 B1 | 12/2004 | Venkatesan et al. |
| 6,834,343 B1 | 12/2004 | Burns |
| 6,874,087 B1 | 3/2005 | Fetkovich et al. |
| 6,880,149 B2 | 4/2005 | Cronce |
| 6,898,706 B1 | 5/2005 | Venkatesan et al. |
| 6,957,341 B2 | 10/2005 | Rice et al. |
| 6,966,002 B1 | 11/2005 | Torrubia-Saez |
| 7,003,731 B1 | 2/2006 | Rhoads et al. |
| 7,047,413 B2 | 5/2006 | Yacobi et al. |
| 7,058,813 B2 | 6/2006 | Burns |
| 7,124,170 B1 | 10/2006 | Sibert |
| 7,143,290 B1 | 11/2006 | Ginter et al. |
| 7,231,524 B2 | 6/2007 | Burns |
| 7,236,610 B1 | 6/2007 | Luo et al. |
| 7,249,176 B1 | 7/2007 | Salas et al. |
| 7,263,722 B1 | 8/2007 | Luo et al. |
| 7,266,217 B2 | 9/2007 | Rhoads et al. |
| 7,269,845 B1 | 9/2007 | Rygaard et al. |
| 7,281,133 B2 | 10/2007 | Ginter et al. |
| 7,287,166 B1 | 10/2007 | Chang et al. |
| 7,334,136 B2 | 2/2008 | Levy et al. |
| 7,353,499 B2 | 4/2008 | de Jong |
| 7,360,252 B1 | 4/2008 | Torrubia-Saez |
| 7,395,433 B2 | 7/2008 | Chow et al. |
| 7,421,586 B2 | 9/2008 | Luo et al. |
| 7,424,620 B2 | 9/2008 | de Jong |
| 7,430,670 B1 | 9/2008 | Horning et al. |
| 7,519,180 B2 | 4/2009 | Wehrenberg |
| 7,603,668 B2 | 10/2009 | Zweifel et al. |
| 7,702,322 B1 | 4/2010 | Maurya et al. |
| 7,739,511 B2 | 6/2010 | Horne et al. |
| 7,770,016 B2 | 8/2010 | Horne et al. |
| 7,779,270 B2 | 8/2010 | Horning et al. |
| 7,779,394 B2 | 8/2010 | Horning et al. |
| 7,823,135 B2 | 10/2010 | Horning et al. |
| 7,926,086 B1 | 4/2011 | Violleau et al. |
| 8,140,850 B2 | 3/2012 | Horne et al. |
| 8,234,387 B2 | 7/2012 | Bradley et al. |
| 8,335,924 B2 | 12/2012 | Horne et al. |
| 8,370,634 B2 | 2/2013 | Horne et al. |
| 8,387,022 B2 | 2/2013 | Horning et al. |
| 8,776,216 B2 | 7/2014 | Boccon-Gibod et al. |
| 8,892,893 B2 | 11/2014 | Horne et al. |
| 9,064,099 B2 | 6/2015 | Horning et al. |
| 2002/0026487 A1 | 2/2002 | Oglvie et al. |
| 2002/0033844 A1 | 3/2002 | Levy et al. |
| 2003/0067489 A1* | 4/2003 | Candy Wong ........ H04L 69/329 715/765 |
| 2003/0161496 A1 | 8/2003 | Hayashi et al. |
| 2004/0172544 A1 | 9/2004 | Luo et al. |
| 2004/0181671 A1 | 9/2004 | Brundage et al. |
| 2005/0021966 A1 | 1/2005 | Chow et al. |
| 2005/0039022 A1 | 2/2005 | Venkatesan et al. |
| 2005/0066181 A1 | 3/2005 | Burns |
| 2005/0071653 A1 | 3/2005 | de Jong |
| 2005/0081042 A1 | 4/2005 | Venkatesan et al. |
| 2005/0160271 A9 | 7/2005 | Brundage et al. |
| 2005/0182956 A1 | 8/2005 | Ginter et al. |
| 2005/0182966 A1 | 8/2005 | Pham et al. |
| 2005/0183072 A1 | 8/2005 | Horning et al. |
| 2005/0204348 A1 | 9/2005 | Horning et al. |
| 2005/0210275 A1 | 9/2005 | Horning et al. |
| 2006/0031686 A1 | 2/2006 | Atallah et al. |
| 2006/0123237 A1 | 6/2006 | Burns |
| 2006/0174348 A1 | 8/2006 | Rhoads et al. |
| 2007/0016790 A1 | 1/2007 | Brundage et al. |
| 2007/0061580 A1 | 3/2007 | Venkatesan et al. |
| 2007/0234070 A1 | 10/2007 | Horning et al. |
| 2008/0028474 A1 | 1/2008 | Horne et al. |
| 2008/0149713 A1 | 6/2008 | Brundage |
| 2008/0215891 A1 | 9/2008 | Horne et al. |
| 2008/0301452 A1 | 12/2008 | Horne et al. |
| 2009/0010423 A1 | 1/2009 | Sibert |
| 2009/0178022 A1 | 7/2009 | Horne et al. |
| 2009/0249489 A1 | 10/2009 | Livshits et al. |
| 2010/0229002 A1 | 9/2010 | Horne et al. |
| 2010/0251231 A1* | 9/2010 | Coussemaeker ......... G06F 8/61 717/176 |
| 2010/0268958 A1 | 10/2010 | Horne et al. |

(56) References Cited

U.S. PATENT DOCUMENTS

| | | | |
|---|---|---|---|
| 2011/0067012 A1* | 3/2011 | Eisen | G06F 8/51 717/140 |
| 2013/0014274 A1* | 1/2013 | Goodes | G06F 21/6209 726/26 |
| 2013/0125090 A1* | 5/2013 | Durand | G06F 8/61 717/106 |
| 2013/0191644 A1 | 7/2013 | Horne et al. | |
| 2014/0115292 A1 | 4/2014 | McLachlan et al. | |
| 2015/0200782 A1 | 7/2015 | Horne et al. | |
| 2015/0278491 A1 | 10/2015 | Horning et al. | |
| 2015/0370548 A1* | 12/2015 | Ayres | G06F 9/454 705/400 |
| 2016/0132317 A1 | 5/2016 | Mitchell et al. | |

OTHER PUBLICATIONS

Collberg et al., "A Taxonomy of Obfuscating Transformations," Jul. 1997, Technical Report #148, The University of Aukland; pp. 1-36.

O'Neill, "Teach Yourself JAVA," Oct. 19, 1998; McGraw-Hill Companies, Inc., Chapter 9.

Sander et al., "Protecting Mobile Agents Against Malicious Hosts," 1998, Lecture Notes in Computer Science vol. 1419.

Sibert, O. et al., "Digibox: A Self-Protecting Container for Information Commerce," Proceedings of the First USENIX Workshop on Electronic Commerce, Jul. 1995, 13 pages, New York, NY.

Sibert, O. et al., "Securing the Content, Not the Wire, for Information Commerce," 1996, 12 pages, InterTrust Technologies Corporation.

Stefik, M., "Introduction to Knowledge Systems, Chapter 7: Classification," 1995, pp. 543-607, Morgan Kaufmann Publishers, Inc., San Francisco, CA.

Stefik, M., "Letting Loose the Light: Igniting Commerce in Electronic Publication," 1994-1995, 35 pages, Xerox PARC, Palo Alto, CA.

Stefik, M., "Letting Loose the Light: Igniting Commerce in Electronic Publication," Internet Dreams: Archetypes, Myths, and Metaphors, 1996, pp. 219-253, Massachusetts Institute of Technology.

Stefik, M., "Trusted Systems," Scientific American, Mar. 1997, pp. 78-81.

Anckaert et al., "A Model for Self-Modifying Code," Lecture Notes in Computer Science, Springer Berlin/Heidelberg, vol. 4437/2007 (Sep. 14, 2007).

Madou et al., "Software Protection through Dynamic Code Mutation," In Proceedings of the 6th International Workshop on Information Security Applications, 2005.

Collberg et al., "Software Watermarking: Models and Dynamic Embedding", 1999, ACM.

Brand, R.; "Coping with the Threat of Computer Security Incidents; A Primer from Prevention through Recovery"; Jun. 8, 1990; 45 pages.

Brockschmidt, K.; "A primer on designing custom controls"; Microsoft Systems Journal 7.n2; Mar./Apr. 1992; pp. 87-101.

Akl, S.G. et al.; "Cryptographic Solution to a Problem of Access Control in a Hierarchy"; ACM Transactions on Computer Systems; vol. 1, No. 3; Aug. 1983; pp. 239-248.

Cox et al., A Review of Watermarking and the Importance of Perceptual Modeling, pp. 1-8 (1997).

Zane, Efficient Watermark Detection and Collusion Security, pp. 21-32 (2000).

Menezes et al., "Chapters 6-8" from *Handbook of Applied Cryptography*, CRC Press, New York, pp. 191-319 (1997).

Schneier, "Chapter 20: Public-Key Digital Signature Algorithms," from *Applied Cryptography, Second Edition*, John Wiley & Sons, INc., New York, pp. 483-502 (1996).

International Search Report and Written Opinion dated Aug. 16, 2016 in related PCT Application No. PCT/US2015/059601.

International Preliminary Report on Patentability dated May 9, 2017 in related PCT Application No. PCT/US2015/059601.

* cited by examiner

SECURE APPLICATION DISTRIBUTION SYSTEMS AND METHODS

RELATED APPLICATIONS

This application is a continuation of U.S. application Ser. No. 14/935,230, filed Nov. 6, 2015, which claims the benefit of priority under 35 U.S.C. § 119(e) to U.S. Provisional Patent Application No. 62/076,354, filed Nov. 6, 2014, and entitled "SECURE APPLICATION DISTRIBUTION SYSTEMS AND METHODS", each of which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND AND SUMMARY

The present disclosure relates generally to systems and methods for distributing secure software applications. More specifically, but not exclusively, the present disclosure relates to systems and methods that use software diversification techniques in connection with generating and distributing secure software applications.

Software applications, including mobile software applications, may be targeted in a variety of attacks. For example, mobile software applications may be targeted in man-at-the-end attacks—attacks against mobile applications from device-resident malware. Maintaining mobile application security may be important to a variety of value chain stakeholders, including device users and other transaction participants. Implementing digital rights management ("DRM") in connection with controlled media applications may help improve application security, and DRM and/or other security methods may be further used in connection with applications involving advertising, payments, and/or other types of value exchange. Secure device hardware may be used to strengthen device security, but such hardware might not be universally deployed across devices.

Systems and methods disclosed herein may use software diversification methods to improve the security of mobile applications. Embodiments of the disclosed systems and methods may, among other things, facilitate secure application distribution through deployment of diverse applications in an application distribution channel. Software diversification consistent with certain disclosed embodiments may mitigate large-scale automated circumvention of security protections by presenting attacking malware with moving and/or otherwise unpredictable diverse targets, akin in certain aspects to a reverse of the strategy used by polymorphic malware in evading anti-virus tools. Consistent with embodiments disclosed herein, applications may be different in their implementation from device to device (i.e., different users may receive different implementations of a single application version), thereby frustrating the deployment of effective malware. In certain embodiments, diversity between applications may be achieved by enabling application stores to distribute various diverse instances of an application to various devices.

BRIEF DESCRIPTION OF THE DRAWINGS

The inventive body of work will be readily understood by referring to the following detailed description in conjunction with the accompanying drawings, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Some embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of certain illustrative embodiments is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the system and methods disclosed herein may employ software diversification in connection with mobile application generation and distribution. In some embodiments, software diversification may be used to alter a software application (e.g., altering an executable binary) in various ways to create multiple instances of the application that, while providing the same and/or similar functionality, to an attacker appear different and/or operate differently (e.g., operate differently on the binary level). Software diversification may frustrate an attacker's attempts to exploit information gained from one deployment of an application to compromise other deployments. Although certain embodiments disclosed herein are discussed in connection with diverse mobile applications and/or mobile devices, it will be appreciated that the disclosed embodiments may be further employed in connection with any other type of software application diversification and/or systems or devices for interacting with and/or executing the same.

In certain embodiments, the systems and methods described herein can, for example, be used in connection with digital rights management ("DRM") technologies such as that described in commonly assigned, co-pending U.S. patent application Ser. No. 11/583,693, "Digital Rights Management Engine Systems and Methods," filed Oct. 18, 2006, and published as U.S. Pub. No. 2007/0180519 ("the '693 application"), service orchestration and DRM technologies such as those described in commonly assigned U.S. Pat. No. 8,234,387, "Interoperable Systems and Methods for Peer-to-Peer Service Orchestration" ("the '387 patent"), (the contents of '693 application and the '387 patent being hereby incorporated by reference in their entireties), as well as in other contexts.

Figure 1:
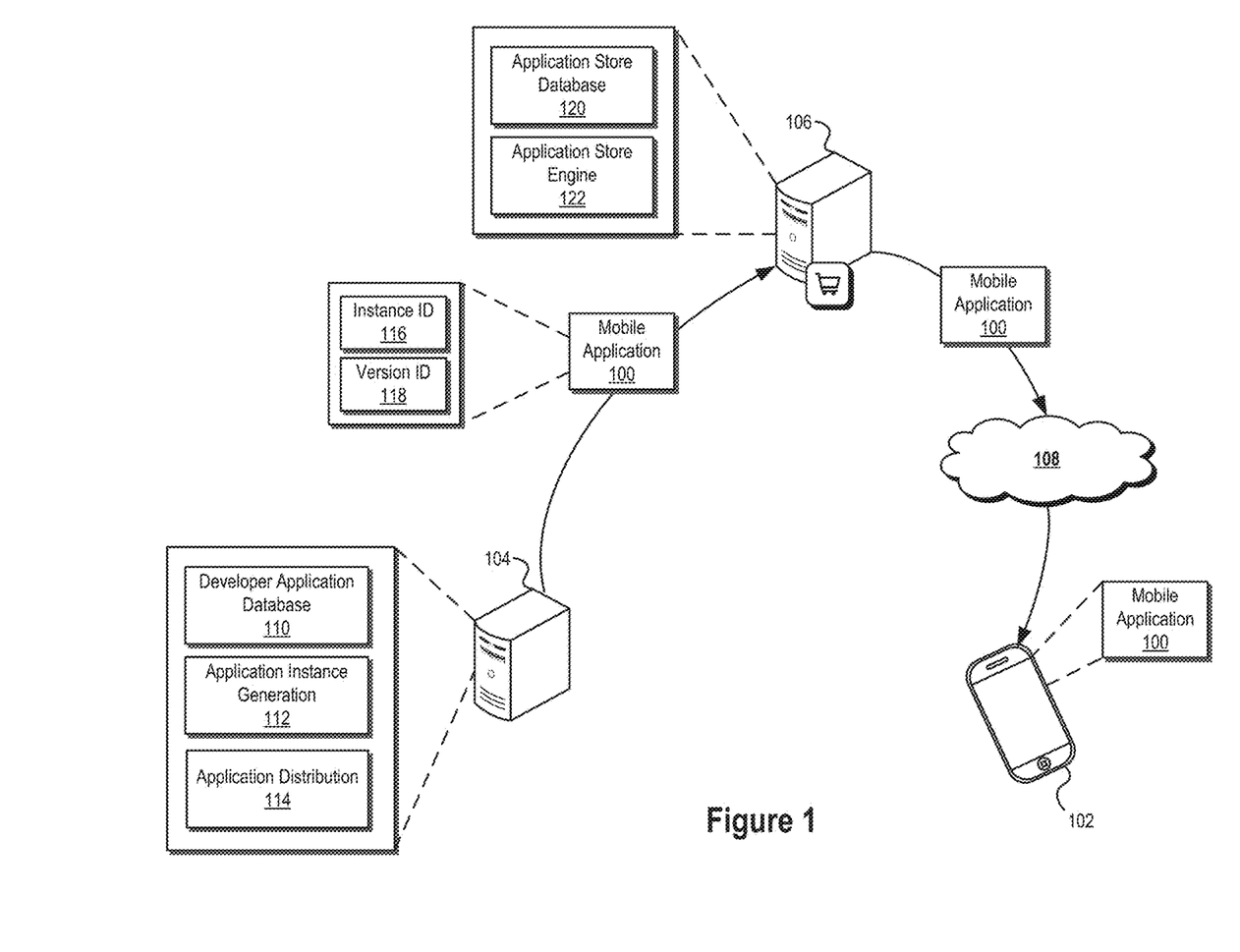
FIG. 1 illustrates deployment of diverse mobile software applications consistent with embodiments of the present disclosure.

FIG. 1 illustrates deployment of a diverse mobile software application 100 to a mobile device 102 consistent with embodiments of the present disclosure. In certain embodiments, a mobile software application 100 may be generated by an application developer system 104 and uploaded to an application store system 106 for distribution to one or more mobile devices 102. In other embodiments, the application developer system 104 may not be directly used to generate the mobile application 100, but may be a system used by and/or otherwise associated with an application developer for use in connection with uploading the mobile application 100 to the application store system 106 for distribution. As discussed in more detail below, the application developer system 104 may continuously and/or periodically upload a plurality of diverse instances of the mobile application 100 to the application store system 106 for distribution to one or more mobile devices 102, thereby reducing the potential for a successful attack against the application 100 across multiple devices.

The application developer system 104, application store system 106, mobile devices 102, and/or other systems (not shown) used in connection with the disclosed embodiments may comprise any suitable computing system or combination of systems configured to implement embodiments of the systems and methods disclosed herein. In certain embodiments, the application developer system 104, application store system 106, mobile device 102, and/or other systems providers may comprise at least one processor system configured to execute instructions stored on an associated non-transitory computer-readable storage medium. As discussed in more detail below, the application developer system 104, application store system 106, mobile device 102, and/or other systems may further comprise a secure processing unit ("SPU") configured to perform sensitive operations such as trusted credential and/or key management, secure policy management, and/or other aspects of the systems and methods disclosed herein. In certain embodiments, the application developer system 104, application store system 106, mobile device 102, and/or other systems may comprise a laptop computer system, a desktop computer system, a server computer system, a smartphone, a tablet computer, and/or any other computing system and/or device that may be used in connection with the disclosed systems and methods.

The application developer system 104, application store system 106, mobile device 102, and/or other systems may further comprise software and/or hardware configured to enable electronic communication of information between the devices and/or systems 102-106 via one or more associated network connections (e.g., network 108). The network connections may comprise a variety of network communication devices and/or channels and may use any suitable communication protocols and/or standards facilitating communication between the connected devices and systems. For example, in some embodiments the network 108 may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee®, and or any other suitable communication protocol(s).

The application developer system 104 may comprise a computing device executing one or more applications configured to implement certain embodiments of the systems and methods disclosed herein. In certain embodiments, the application developer system 104 may be used by a developer to code, compile, and/or otherwise generate a mobile application 100 and/or a particular instance of the mobile application (e.g., a unique instance or the like). In other embodiments, the application developer system 104 may be used to manage one or more mobile applications generated using a separate system (not shown). In some embodiments, applications and/or instances thereof, described in more detail below, may be stored and/or otherwise managed by the application developer system 104 in an application database 110.

The application developer system 104 may be configured to diversify distributed mobile applications 100 by generating a plurality of instances of the mobile application 100 that, in certain embodiments, may be unique instances. In certain embodiments, diversified application instances may have the same and/or similar functionality but may be altered in such a way that to an attacker (e.g., malware or the like) they appear to be different and/or operate differently.

As discussed in more detail below, diversity in applications may be introduced at a variety of times in the application generation and/or build process to create various application instances. For example, diversity may be introduced during coding of an application, at various stages of compilation of the application, and/or during a provisioning and/or personalization process. In certain embodiments, diverse application instances may be generated by an application instance generation engine 112 executing on the application developer system 104. A variety of types of software diversification may be used in connection with the disclosed embodiments including, without limitation, data diversification and/or code diversification. In certain embodiments, both data diversification and code diversification may be employed in connection with generating diverse software instances.

Embodiments employing data diversification may embed certain data values referenced by application code that vary among different instances of the same application. As an example, the application instance generation engine 112 may embed different cryptographic keys across various application instances configured to encrypt information stored on an executing device or that excerpts other keys imported into the application. Even if an attacker managed to extract the cryptographic key embedded in a particular application instance, the attacker could not use the extracted key to decrypt certain secret information included in other application instances. In certain embodiments, data diversification may be introduced by injecting unique and/or otherwise personalized data values into program code (e.g., binary image code) during code compilation and/or deployment. Data values introduced as part of data diversification methods consistent with the disclosed embodiments may further include, without limitation, keys, nonces, salt, white-box cryptography ("WBC") data structures, homomorphic encryption including fully homomorphic encryption ("FHE") data structures, and/or other randomly generated cryptographic information.

In some embodiments, a secure key provisioned as part of a data diversification process may be stored by in a protected processing environment such as a secure key box. In certain embodiments, a secure key box may be configured to protect the secrecy and/or integrity of the secure key. The secure key box may further protect software code used in connection with secure computations performed by an associated device using code digests and/or any other verifiable computing techniques.

In some embodiments, the secure key box may use white-box cryptographic and/or homomorphic encryption methods (e.g., FHE methods) that allow the secure key to remain encrypted, even during execution of associated cryptographic methods. In certain embodiments, the secure key box may enable the secure key to be stored and/or used in connection with cryptographic methods without exposing the secure key in clear text. For example, in some embodiments, the secure key box may allow storage and/or use of the secure key without exposing the secure key in code and/or in memory of a device 102 having an open architecture. In certain embodiments, a secure key box may be implemented separately and/or in connection with a hardware-isolated secure enclave and/or a more traditional secure hardware element (e.g., a subscriber identity module ("SIM") chip and/or a smart card chip) for use in connection key operations.

The secure key box may be used in connection with both static keys and/or encrypted dynamic keys that may be loaded and/or decrypted at run time. In further embodiments, separate secure key boxes associated with different devices may store and/or operate on secure keys using different encryption formats. In certain embodiments, a secure key box may enable protection of secure keys and/or computations performed using the same without the use of dedicated security hardware included in a device 102.

In some embodiments, secure information such as, for example, the secure key may be encrypted when transmitted out of a secure key box. In certain embodiments, the secure key may be managed by a personalization service, described in more detail below, in a separate secure key box operating thereon (not shown). When transmitted from the secure key box of the personalization service as part of a personalization process of an application, the secure key box of the personalization service may encrypt the secure key with a common export key shared with the secure key box of the device 102. In some embodiments, the secure key may be encrypted with a shared symmetric key and/or a public asymmetric key. Upon receipt by the client device 102, the secure key box of the device 102 may decrypt the received encrypted secure key using the common export key for use in connection cryptographic methods.

Embodiments employing code diversification may introduce varied instructions (e.g., binary instructions) between different application instances and/or between separate sets of application instances. In certain embodiments, code diversification may be introduced using methods to improve the tamper-resistance of a software application including, without limitation, code obfuscation, instruction set randomization, integrity protection, junk code insertion, code expansion, and/or virtualization. In some embodiments, a subset and/or component of an application may include diversified code across various instances of the application. For example, sensitive parts of application code may include diversified code across instances (e.g., cryptographic routines and/or components or the like). In other embodiments, code diversification may be employed across an entire application executable.

In certain embodiments, diversified applications 100 may include information identifying a particular instance of the application and/or version of the application. For example, as illustrated in FIG. 1, a mobile application 100 may comprise an instance ID 116 and a version ID 118. Consistent with embodiments disclosed herein, a plurality of application instances (e.g., applications having different instance IDs 116) may be associated with a particular version ID 118, and various application instances and/or versions may be managed together and/or separately in accordance with the disclosed embodiments. In some embodiments, the instance ID 116 associated with a particular application may be used by a developer post-deployment in connection with application diagnosis, error reporting, and/or the like.

An instance of a mobile application 100 may be uploaded by the application developer system 104 to the application store system 106 for distribution to one or more mobile devices 102. The application store system 106 may include an application store database 120 storing one or more mobile applications and/or instances thereof. An application store engine 122 may be configured to manage requests from mobile devices 100, uploading operations from developer systems 104, and/or otherwise coordinate the downloading of applications 100 to mobile devices 102 and other operations of the application store system 106.

In certain embodiments, the upload of the mobile application 100 to the application store system 106 may be managed by an application distribution module 114 executing on the application developer system 104. The application distribution module 114 may employ a variety of possible uploading methodologies with respect to varied application instances that, in some embodiments, may be articulated in an application diversification schedule and/or policy. For example, in some embodiments, a first software application instance may be initially uploaded to the application store system 106. After a particular period of time has elapsed (e.g., an hour, a day, a week, etc.), a second software application instance replacing the first software application instance may be uploaded to the application store system 106. Based on the time when mobile devices (e.g., mobile device 102) download the application from the application store system 106, the mobile devices will receive different instances of the application (e.g., the first or second instance), thereby facilitating application diversity across a number of devices.

Application diversification policies may further employ other time-based diversification schedules. For example, a diversification schedule may facilitate continuous uploading of various application instances to the application store system 106 by the developer system 104 at a variety of suitable fixed time frequencies and/or based on an irregular or otherwise random pattern. Diversification policies and/or schedules may, in addition and/or in alternative to being time-based, be based on geographic and/or device parameters. For example, varied application instances may be uploaded to the application store system 106 for distribution to devices located in different geographic regions. Similarly, varied application instances may be uploaded to the application store system 106 for deployment to varied types of devices, device models, individual serialized devices, and/or the like. It will be appreciated that a wide variety of application diversification schedules and/or policies may be used in connection with the disclosed systems and methods, and that the disclosed embodiments may employ any suitable schedule and/or policy that results in differentiation between application instances across multiple devices.

Certain application store systems 106 may require that an application 100 be inspected and/or otherwise tested for compliance with one or more requirements prior to distribution to devices 102. For example, after an application 100 is initially uploaded to the application store system 106, the system 106 may inspect and/or test the application 100 for compliance with certain security requirements. New versions of the application 100 uploaded to the application store system 106 may be similarly tested and/or inspected.

In some embodiments, applications 100 may be diversified such that various instances of the application do not need to be individually inspected and/or tested for compliance with application store system 106 requirements. In certain embodiments, this may be achieved by introducing diversity (e.g., code and/or data diversity) into portions of an application's code that are not tested and/or otherwise inspected by the application store system 106. In some embodiments, this may streamline the process of uploading various application instances 100 to the application store system 106 and reduce the burden on the application store system 106 to inspect and/or test each instance.

Certain application store systems 106 may be configured to push updates of an application to certain devices 102 when a new version of an application 100 is uploaded to the application store system 106. In embodiments employing time-based diversification policies and/or schedules for release of various application instances, such a push and/or pull update of a new application version may undesirably result in a large number of devices 102 being updated with the same application instance (e.g., the initial instance of the new application version). Accordingly, in some embodiments, release of new versions to certain devices 102 may be delayed following an initial version release (e.g., randomly delayed, delayed according to a particular schedule, etc.) such that devices receive varied application instances of the new application version in connection with application updates. In some embodiments, diversity may be introduced in connection with software updates and/or new version updates to ensure updates and/or new versions comprise diverse and/or otherwise unique instances of the application 100.

It will be appreciated that a number of variations can be made to the architecture and relationships presented in connection with FIG. 1 within the scope of the inventive body of work. For example, without limitation, in some embodiments, some or all of the functions performed by the application developer system 104 may be performed by the application store system 106. Similarly, some or all of the functions performed by the application store system 106 may be performed by the application developer system 104. Thus it will be appreciated that FIG. 1 is provided for purposes of illustration and explanation, and not limitation.

Figure 2:
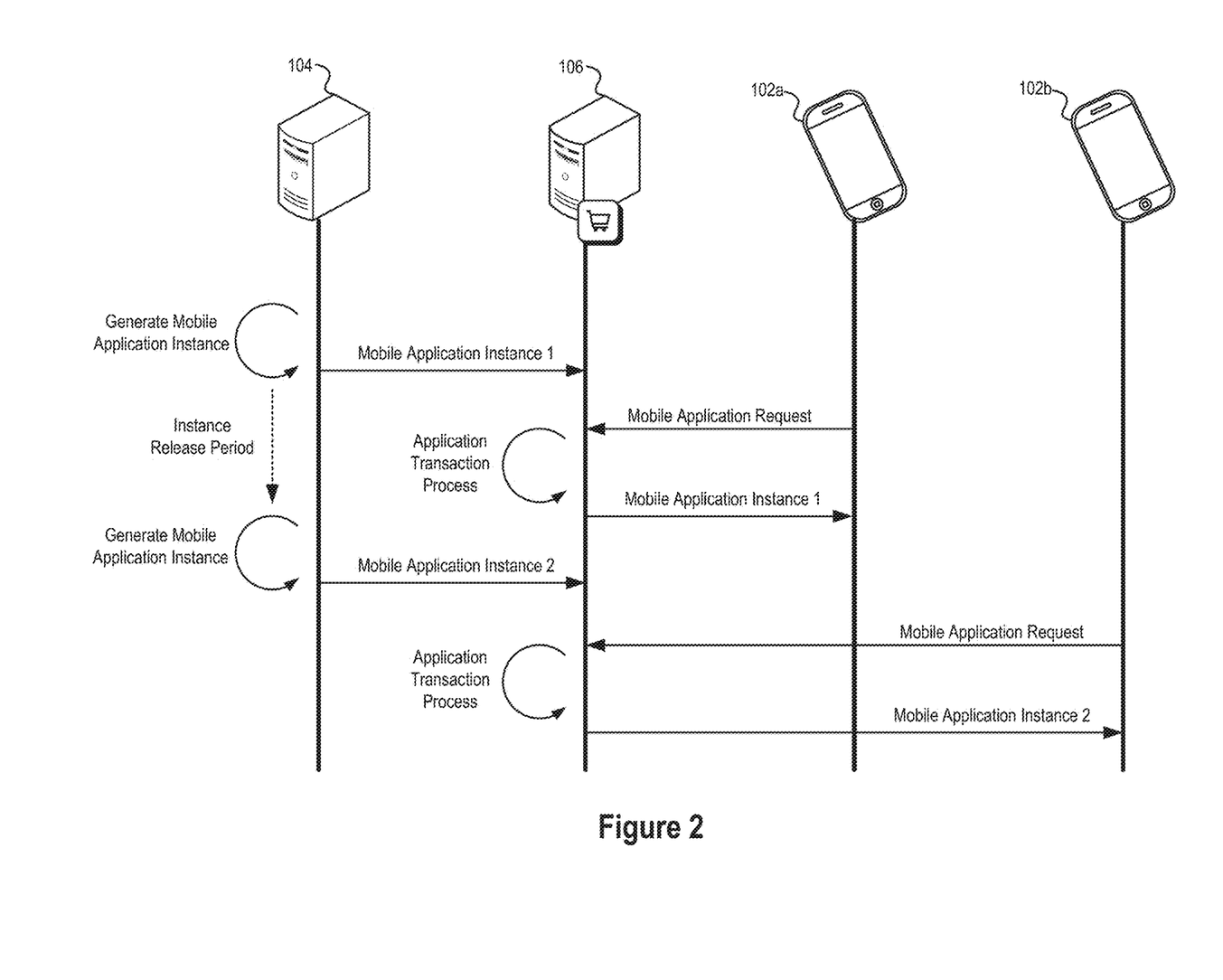
FIG. 2 illustrates a process of generating and distributing diverse secure mobile software applications consistent with embodiments of the present disclosure.

FIG. 2 illustrates a process of generating and distributing diverse secure mobile software applications consistent with embodiments of the present disclosure. As illustrated, the application developer system 104 may generate a first instance of a mobile application ("Mobile Application Instance 1") using any suitable method of introducing diversity between various application instances (e.g., code diversification, data diversification, code obfuscation, etc.). The first instance may be uploaded to an application store system 106 for deployment to one or more mobile devices 102*a*, 102*b*. In certain embodiments, uploading of the first instance may be based, at least in part, on an articulated application diversification schedule and/or policy.

After the first application instance has been uploaded to the application store system 106, a mobile device 102*a* may issue a request to download and/or otherwise install the application. In response to this request, the application store system 106 may transmit the first instance of the application to the mobile device 102*a*. Upon receipt of the first instance, the mobile device 102*a* may perform an installation process to install the application on the device 102*a*.

An application diversification schedule and/or policy associated with a particular application may articulate that new application instances should be generated by the application developer system 104 and uploaded to the application store system 106 according to a time-based schedule (e.g., following a fixed and/or randomly determined release period between instance releases or the like). Accordingly, at the completion of an instance release period, the application developer system 104 may generate a second instance of a mobile application ("Mobile Application Instance 2") using any suitable method of introducing diversity between various application instances and may upload the second instance to the application store 106 for deployment to requesting mobile devices 102*a*, 102*b*.

Once uploaded, the second application instance may replace the first application instance in the application store system 106. Accordingly, a mobile device 102*b* issuing a request to download and/or otherwise install the application after the second application instance has been uploaded to the application store system 106 may receive the second instance of the application in response to the request for installation. In this manner, based on the mobile devices 102*a* and 102*b* having requested the application from the application store system 106 at different times, the devices 102*a*, 102*b* may receive different instances of the application, thereby providing application diversity between the devices 102*a*, 102*b* installing the deployed applications and improving their associated security.

Figure 3:
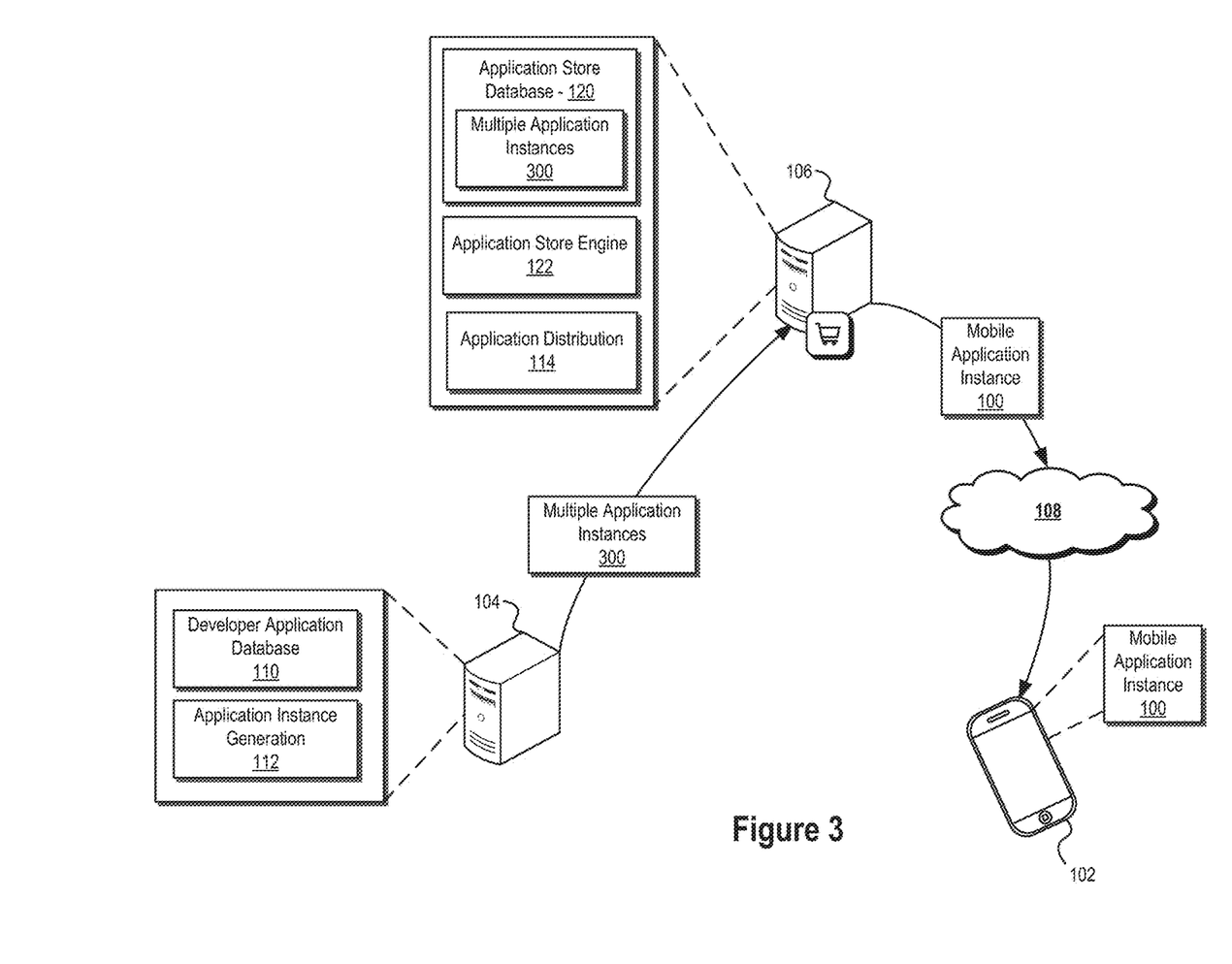
FIG. 3 illustrates generation and deployment of mobile software application instances to an application store for distribution to devices consistent with embodiments of the present disclosure.

FIG. 3 illustrates generation and deployment of mobile software application instances to an application store for distribution to devices consistent with embodiments of the present disclosure. In certain embodiments, in lieu of and/or in addition to uploading a single instance of an application to an application store system 106 at a particular time (e.g., based on an instance release schedule and/or policy or the like), the application developer system 106 and/or an application instance generation engine 112 executing thereon may generate a plurality of diverse application instances 300 and upload the plurality of diverse application instances 300 to the application store system 106.

Application instances 300 uploaded to the application store system 106 may be included and/or managed in an application store database 120. When the application store system 106 receives a request from a mobile device 102 to download the application, the application store system 106 may select and transmit an instance of the application from the plurality of application instances 300 included in the database 120. In some embodiments, the particular instance may be selected from the plurality of instances 300 based on a diversification policy and/or schedule. For example, a time-based diversification policy, a location-based diversification policy, and/or a device-based diversification policy may be used in connection with selecting and/or distributing a particular application instance 100 of the plurality of instances 300. In some embodiments, the selection and/or distribution of the application instance 100 may be performed using, at least in part, an application distribution module 114 executing on the application store system 106.

As an example, in some embodiments, the application store system 106 may distribute a first application instance 100 from the plurality of instances 300 to requesting devices 102 for a certain instance release period), and then continuously cycle through distributing different applicant instances of the plurality during subsequent instance release periods. In another example, the application store system 106 may distribute application instances 100 from the plurality of application instances 300 that are unique to each requesting device 102. The application store system 106 may further randomly distribute application instances 100 from the plurality of instances 300 to requesting devices 102. In yet another example, the application store system 106 may distribute a first application instance 100 from the plurality of instances 300 to requesting devices 102 included in a first geographic region, and distribute different instances to requesting devices located in other regions.

In certain embodiments, by implementing instance selection and/or determination decisions using the application store system 106, greater diversity of deployed instances 100 may be achieved as more granular instance selection determinations may be made based on a particular requesting device 102. In addition, the burden on the application developer system 104 and/or the application store system 106 associated with continuously uploading new instances for distribution may be reduced. Similarly, the burden of frequent inspection and/or otherwise testing of application instance compliance with store requirements may be reduced, as all and/or a subset of the plurality of instances 300 may be inspected and/or tested for compliance as a group, thereby streamlining the inspection and/or testing process.

Figure 4:
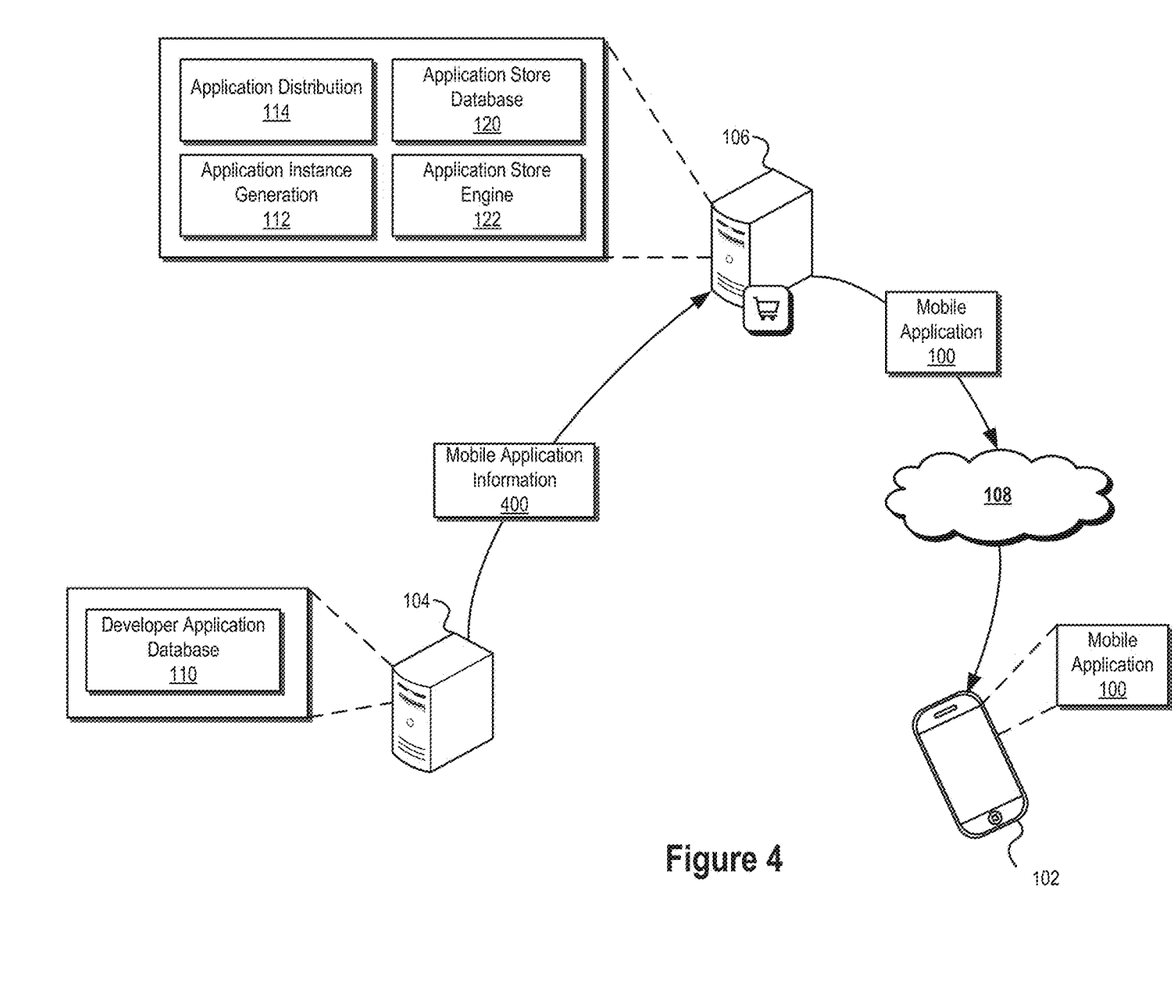
FIG. 4 illustrates generation and deployment of mobile software application instances by an application store consistent with embodiments disclosed herein.

FIG. 4 illustrates generation and deployment of mobile software application instances by an application store system 106 consistent with embodiments disclosed herein. In some embodiments, the application store system 106 may be configured to generate diverse application instances 100 for distribution to mobile devices based on information provided by the application software developer system 104 (e.g., an undiversified application 400 or the like).

Diversity in applications may be introduced at a variety of times in the application 100 generation and/or build process to create various application instances. For example, diversity may be introduced during coding of an application, at various stages of compilation of the application, and/or during a provisioning and/or personalization process, certain aspects of which may be performed by the application store system 106. In certain embodiments, diverse application instances may be generated by an application instance generation engine 112 executing on the application store system 104 employing any of the types of software diversification methods disclosed herein.

In certain embodiments, the application store system 106 and/or an instance generation engine 112 executing thereon may be configured to generate application instances 100 by including diversified code and/or data in certain components and/or portions of the application. For example, in some embodiments, diverse instances 100 may be generated by including diverse code between multiple instances in a particular component of an application. In further embodiments, diverse instances may be generated by including certain diverse data such as a cryptographic key or the like between multiple instances of the application. In certain embodiments, diversifying a subset and/or a component of an application rather than an entire application may reduce the burden on the application store system 106 in connection with generating diverse instances 100.

In further embodiments, the application store system 106 and/or the instance generation engine 112 executing thereon may be configured to perform a portion of a build process for an application to generate a diversified instance 100 of the application. In such embodiments, the application developer system 104 may transmit information (e.g., undiversified application information 400) to the application store system 106 used to complete a build process for the application to generate an associated application instance 100. In some embodiments, the application developer system 104 may further transmit instructions and/or preferences for introducing diversity to the application store system 106 and/or to safeguard application performance and/or user experience requirements.

As an example, the application developer system 104 may transmit application information 400 to the application store system 106 that comprises application bit code and/or an intermediate representation of the application. Using the application information 400, the application store system 106 and/or the instance generation engine 112 may perform bit code obfuscation to diversify the bit code and/or the intermediate representation of the application. The application store system 106 may then perform a back end compilation process on the application bit code and/or intermediate representation to generate a machine code representation of the application which may be used to generate an executable application instance 100 for transmission to requesting mobile devices 102. In certain embodiments, generation of the application instance 100 and/or the bit code obfuscation and/or backend compilation process may be performed in response to receiving a request from a mobile device 102 to download the application (i.e., just-in-time ("JIT") instance generation).

In certain embodiments, generating diverse application instances at the application store system 106 may allow for individualized and/or otherwise serialized unique application instances to be generated for individual requesting devices 102. For example, in some embodiments, serialized and/or otherwise unique information associated with a requesting device 102 may be used by the application store system 106 in connection with generating a diverse application instance 100. In further embodiments, serialized and/or otherwise unique information associated with a user of a requesting device (e.g., user account, registration, and/or authentication data) may be used by the application store system 106 in connection with generating diverse application instances 100.

In some embodiments, an application distribution module 114 executing on the application store system 106 may be configured to manage the generation and/or distribution of unique application instances 100 to requesting devices 102 (e.g., based on an associated diversification policy and/or schedule or the like). Generating diverse application instances 100 at the application store system 106 may further reduce the burden of generation and/or uploading a plurality of application instances by the application developer system 104, and may further streamline application and/or testing processes performed by the application store system 106.

Figure 5:
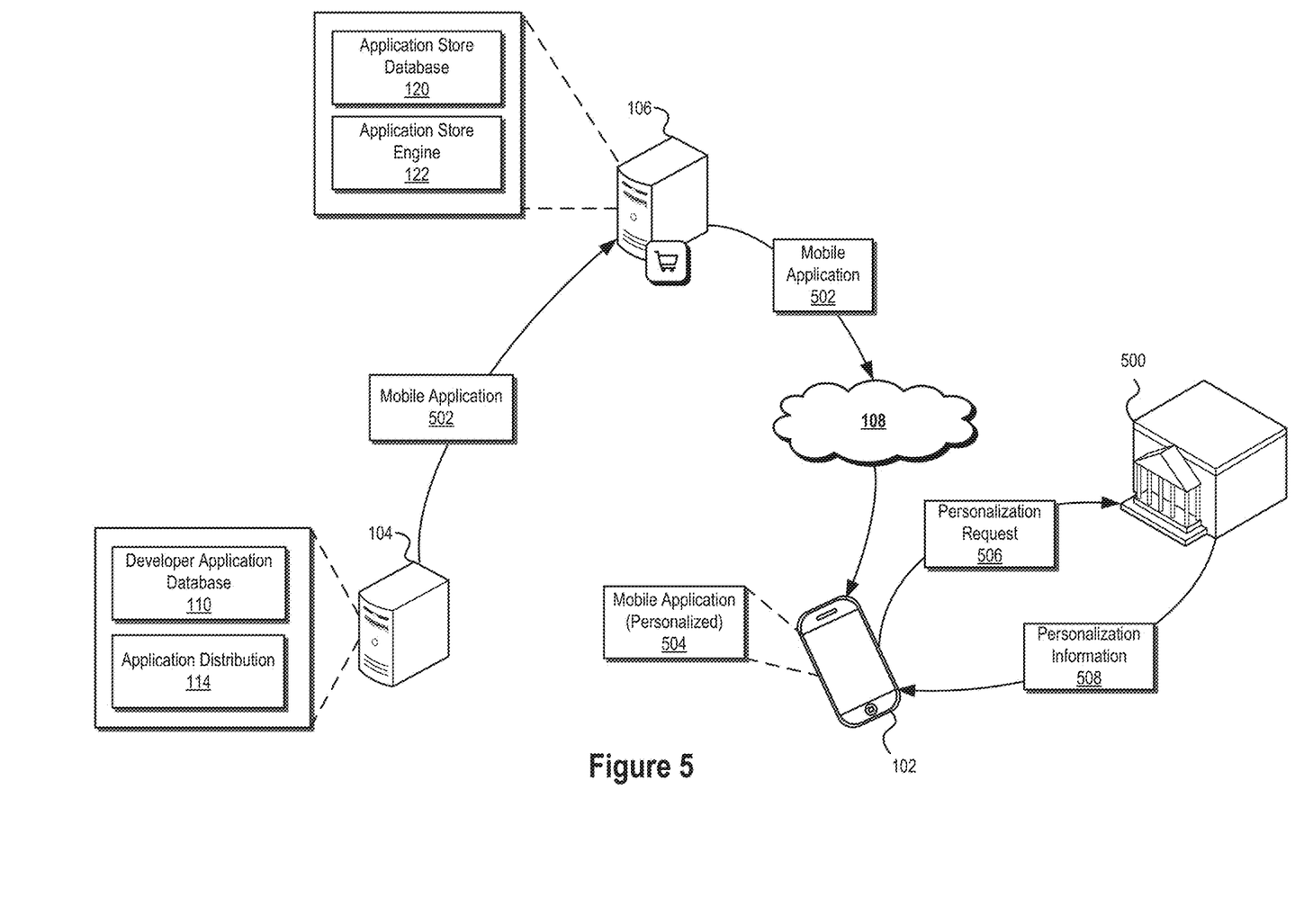
FIG. 5 illustrates personalization of a mobile application by a device using a personalization service consistent with embodiments disclosed herein.

FIG. 5 illustrates personalization of a mobile application 502 by a device 102 using a personalization service 500 consistent with embodiments disclosed herein. In some embodiments, diversity in an application may be introduced by a device 102 after downloading the application 502 from the application store system 106 through a personalization and/or provisioning process.

As illustrated, an application developer system 104 may provide the application store system 106 with a mobile application 502 configured to be personalized during and/or following installation of the application 502 on a device 102. After downloading the application 502 from the application store system 106 and during and/or following the installation of the application 502, the mobile device 102 may issue a personalization request 506 to a personalization service 500, which may comprise any suitable computer system configured to implement application personalization methods consistent with the disclosed embodiments. In response to the personalization request 506, the personalization service 500 may generate and/or access personalization information 508 and transmit the personalization information 508 to the mobile device 102. The personalization information 508 may include any suitable information for use in connection with generating a unique application instance including, for example, code patches, keys, data values, user account information, user registration information, and/or the like. The mobile device 102 may use the personalization information 508 to generate a personalized and/or otherwise diversified instance of the application 504 for execution on the device 102. For example, using the personalization information 508, the mobile device 102 may embed and/or otherwise reference certain data values unique to the instance of the application 504, thereby introducing data diversity to the application 504.

In at least one example, following receipt of a mobile application from the application store system 106, the mobile device 102 may request the personalization service 500 to generate and provide a unique key used for use in connection with cryptographic operations performed by the mobile application. The personalization service 500 may generate the key and return it to the mobile device 102. Upon receipt, the mobile device 102 may provision the cryptographic components of the mobile application with the key to generate a diversified application instance 504.

In some embodiments, when diversity is introduced by the mobile device 102 through a personalization and/or provisioning process, certain security measures may be taken to reduce the potential for the application 504 to be compromised by an attack. For example, code patches included in personalization information 508 may be signed and signature verification may be strongly enforced by the device 102. In further embodiments, the mobile device 102 may comprise a hardware-enforced secured environment for code loading and/or personalization of the application 502 to generate a diversified application instanced 504. Various software code protection techniques to protect diversity mechanisms may further be delivered directly to the device 102 to improve security of the personalization process. Introducing diversity at the mobile device 102 may, among other things, reduce the burden on the application developer system 104 and/or application store system 106 of application instance generation and/or applying schedules or policy associated with distribution of various application instances.

Figure 6:
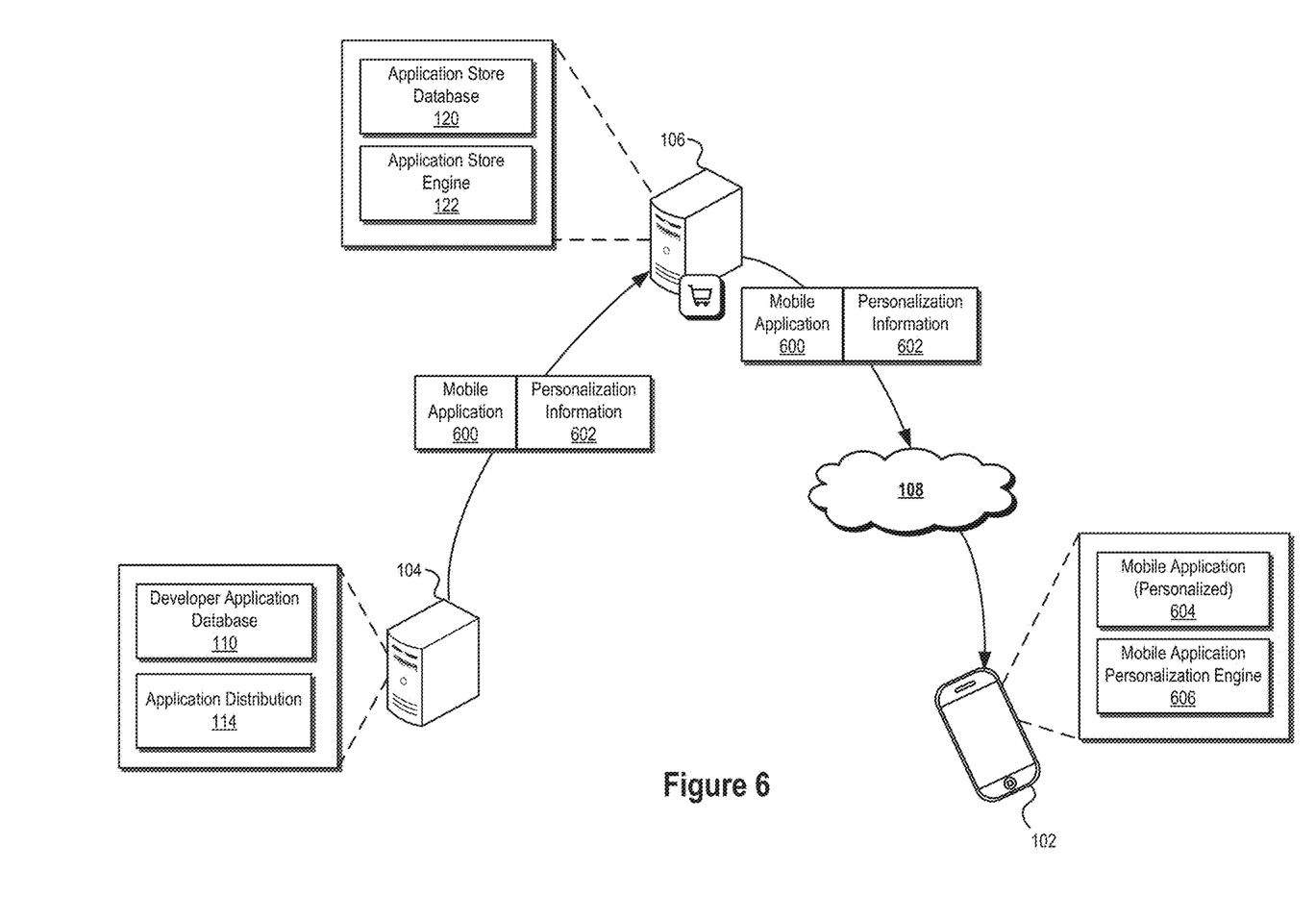
FIG. 6 illustrates personalization of a mobile application by a device consistent with embodiments disclosed herein.

FIG. 6 illustrates personalization of a mobile application 600 by a mobile device 102 consistent with embodiments disclosed herein. In certain embodiments, personalization information 602 may be generated and/or otherwise accessed by an application developer system 104 and/or an application store system 106. The personalization information 602 may be downloaded to the mobile device 102 from the application store system 104 together with and/or separately from the mobile application 600.

In some embodiments, the personalization information 602 may include information to personalize and/or otherwise diversify a single instance of an application. For example, the personalization information 602 may comprise a key used to diversify cryptographic components of an application instance. In other embodiments, the personalization information 602 may include information that may be used to generate a plurality of application instances 604. As part of a personalization and/or diversification process to generate an application instance, a subset of the information included in the personalization information 602 may be selected and used in connection with a personalization process to generate a diversified instance of the application 604. In certain embodiments, such a process may be performed by a mobile application personalization engine 606 executing on the mobile device 102.

In at least one example, the personalization information 602 may comprise a plurality of cryptographic keys. In connection with a personalization and/or diversification process to generate an application instance 604, the mobile application personalization engine 606 may randomly select a cryptographic key of the plurality of cryptographic keys and provision the cryptographic components of the mobile application 600 with the selected cryptographic key to generate a diversified application instance 604. In this manner, a common library of personalization information 602 may be sent to a number of mobile devices that may use information in the library to generate a diversified and/or otherwise unique application instance 604.

Figure 7:
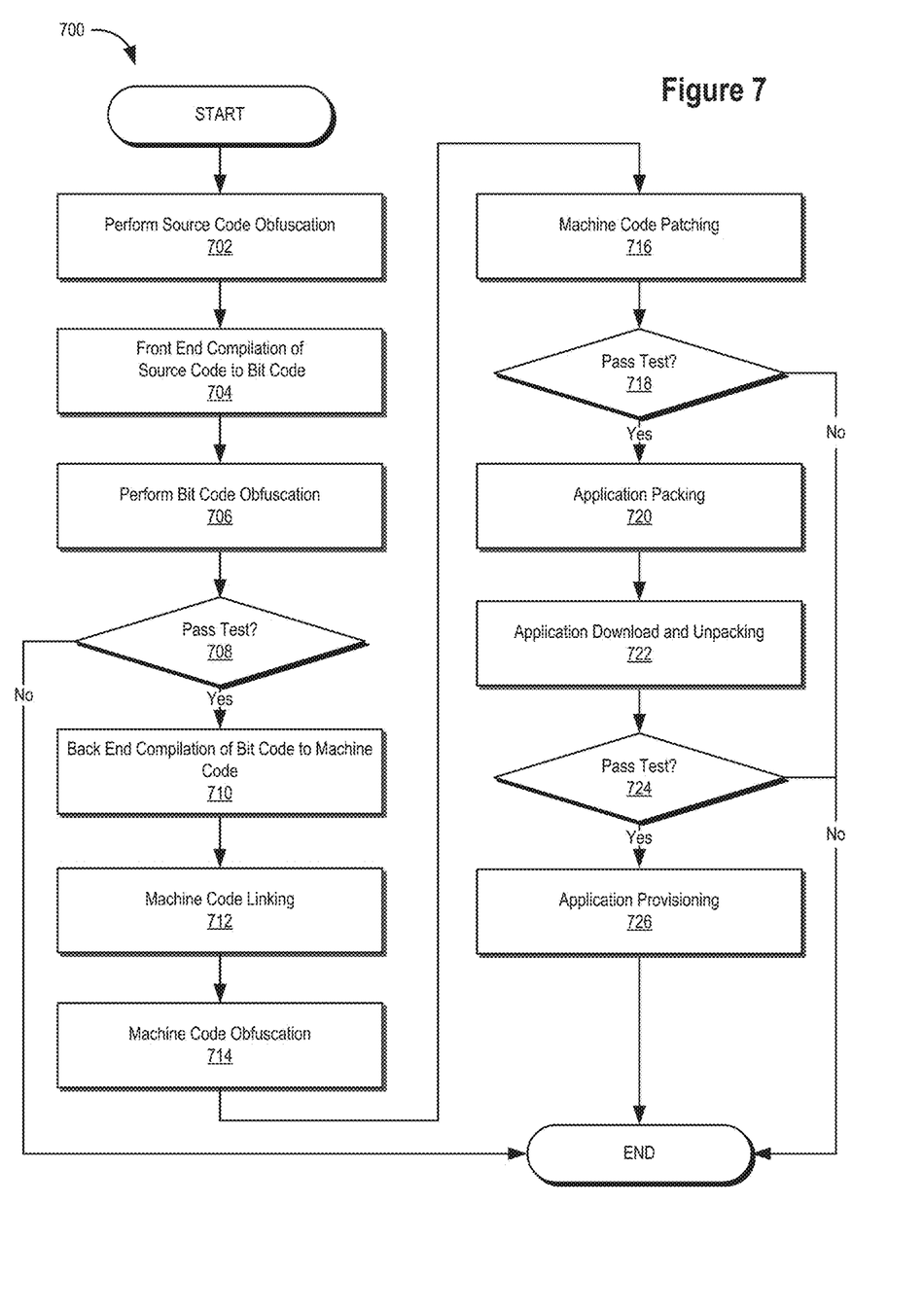
FIG. 7 illustrates a flow chart of a mobile application build and deployment process consistent with embodiments disclosed herein.

FIG. 7 illustrates a flow chart of a mobile application build and deployment process 700 consistent with embodiments disclosed herein. The illustrated process 700 may be implemented in a variety of ways, including using software, firmware, hardware, and/or any combination thereof. In certain embodiments, various aspects of the method 700 may be implemented by an application developer system, an application store system, a mobile device, a personalization service system, an update system, and/or any other related system as described above. Certain embodiments included in the illustrated process 700 may implement code diversity in connection with generating diversified application instances. It will be appreciated, however, that data diversity may be similarly implemented in connection with the illustrated process. In addition, it will be appreciated that a mobile application build and deployment process may incorporate all of the elements of the illustrated process 700 or a subset thereof, and may proceed in any suitable order.

At 702, source code associated with an application may be obfuscated using any suitable source code software obfuscation technique. Front end compilation of the obfuscated application source code may be performed at 704 to generate a bit code and/or intermediate representation of the application code. Bit code obfuscation methods may be performed at 706 that introduce diversity into the particular application instance being built.

To ensure the obfuscation does not detrimentally alter the expected functionality of the bit code, the bit code may be tested at 708 to see if the bit code functions as expected. If the bit code does not function as expected, the method 700 may proceed to terminate. If the bit code functions as expected, the method 700 may proceed to 710, where back end compilation of the bit code and/or intermediate representation code may be performed to generate machine code. In certain embodiments, the back end compilation and/or certain other subsequent steps may be performed by an application store system prior to delivering the application instance to the device.

Following back end compilation, linking of the machine code may be performed at 712. Compilation may produce several object files referring to code entry points and global variables by symbolic address. A linker may be provided with some initial required code entry points to build in, and may select which dependent pieces of object code are to be used in the linking operation. The linker may arrange how the object code is to be loaded in an executable memory space, and may resolve symbolic addresses to numerical addresses. The linker may further produce an executable (e.g., machine code) program file and/or an executable library (e.g., DLL or SO file). In some embodiments, program dependencies that reside in dynamic libraries (e.g, DLL or SO) may be resolved at load time or at run time by a linking loader, which may be part of the target device's operating system.

At 714, the linked machine code may be obfuscated. As detailed above, machine code obfuscation may examine the machine code following linking and apply certain code transformations to make the code difficult to reverse engineer and/or to foil static analysis tools. Machine code patching may be performed at 716, where certain changes to the executable application and/or its accompanying resources may be applied. In certain embodiments, patching may facilitate referencing of certain numerical code addresses following obfuscation processes.

To ensure the obfuscation does not detrimentally alter the expected functionality of the machine code, the machine may be tested at 718 to see if the code functions as expected. If the code does not function as expected, the method 700 may proceed to terminate. If the code functions as expected, the method 700 may proceed to 720, where the application may be packed for delivery to devices.

The application may be downloaded by a device and unpacked at 722. Although not illustrated, the application may further be patched by the device after unpacking to introduce diversity to the application. In some embodiments, the application may be tested by the device at 724 to determine whether it functions as expected. If the application does not function as expected, the method 700 may proceed to terminate. If the application functions as expected, the method 700 may proceed to 726, where the application may be provisioned with certain information. For example, in some embodiments, a personalization process may be performed to provision the application with certain personalized information (e.g., personalized keys or the like), thereby introducing further diversity to the application.

Figure 8:
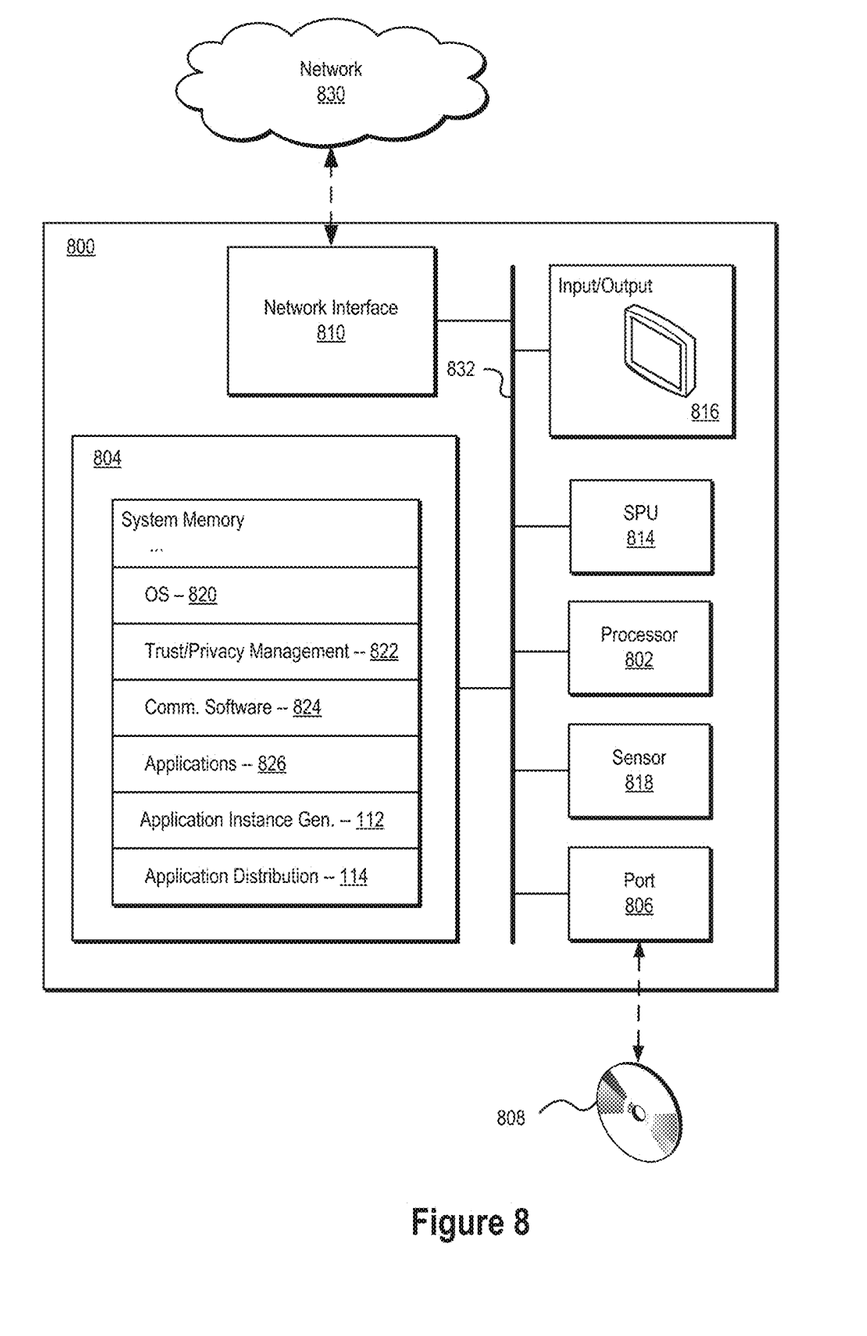
FIG. 8 illustrates a system that may be used to implement certain embodiments of the systems and methods of the present disclosure.

FIG. 8 illustrates a system 800 that may be used to implement certain embodiments of the systems and methods of the present disclosure. The system 800 may comprise an application developer system, an application store system, a mobile device, a personalization service system, an update system, and/or any other system configured to implement certain aspects the systems and methods described herein. In certain embodiments, the system 800 may perform certain functions associated with an authentication device, a trusted authority, and/or another related service as disclosed herein.

As illustrated in FIG. 8, system 800 may include: a processor 802; system memory 804, which may include high speed RAM, non-volatile memory and/or one or more bulk non-volatile computer-readable storage mediums (e.g., a hard disk, flash memory, etc.) for storing programs and other data for use and execution by the processor 802; an interface 816 (e.g., an input/output interface) that may include a display and/or one or more input devices such as, for example, a touchscreen, a keyboard, a mouse, a track pad, and the like; a port 806 for interfacing with removable memory 808 that may include one more diskettes, optical storage mediums, and/or other computer-readable storage mediums (e.g., flash memory, thumb drives, USB dongles, compact discs, DVDs, etc.); a network interface 810 for communicating with other systems via a network 812 using one or more communication technologies; one or more sensors 818 that may comprise one or more location sensors; and one or more buses 832 for communicatively coupling the aforementioned elements.

In certain embodiments, network 830 may comprise the Internet, a local area network, a virtual private network, and/or any other communication network utilizing one or more electronic communication technologies and/or standards (e.g., Ethernet or the like). In some embodiments, the network interface 810 and/or network 830 may be part of a wireless carrier system, such as a PCS, and/or any other suitable communication system incorporating any suitable communication standards and/or protocols. In further embodiments, the network interface 810 and/or network 830 may be part of an analog mobile communications network and/or a digital mobile communications network utilizing, for example, CDMA, GSM, FDMA, and/or TDMA standards. In still further embodiments, the network interface 810 and/or network 830 may incorporate one or more satellite communication links and/or use IEEE's 802.11 standards, near-field communication, Bluetooth®, UWB, Zigbee®, and or any other suitable standard or standards.

In some embodiments, the system 800 may, alternatively or in addition, include a SPU 814 that is protected from tampering by a user of system 800 or other entities by utilizing secure physical and/or virtual security techniques. An SPU 814 can help enhance and/or facilitate the security of sensitive operations such as private management of secret or other secure information, and other aspects of the systems and methods disclosed herein. In certain embodiments, the SPU 814 may operate in a logically secure processing domain and be configured to protect and operate on secret information. In some embodiments, the SPU 814 may include internal memory storing executable instructions or programs configured to enable to the SPU 814 to perform secure operations.

The operation of system 800 may be generally controlled by the processor 802 operating by executing software instructions and programs stored in the system memory 804

(and/or other computer-readable media, such as removable memory 808). The system memory 804 may store a variety of executable programs or modules for controlling the operation of the system 800. For example, the system memory 804 may include an operating system ("OS") 820 that may manage and coordinate, at least in part, system hardware resources and provide for common services for execution of various applications and a trust and privacy management system 822 for implementing trust and privacy management functionality including protection and/or management of secret information. The system memory 804 may further include, without limitation, communication software 824 configured to enable in part communication with and by the system 800, applications 826 and/or an application store, an application instance generation engine 112 configured to generate diversified application instances, an application distribution module 114, and/or any other information and/or applications configured to implement embodiments of the systems and methods disclosed herein.

One of ordinary skill in the art will appreciate that the systems and methods described herein can be practiced with computing devices similar or identical to that illustrated in FIG. 8, or with virtually any other suitable computing device, including computing devices that do not possess some of the components shown in FIG. 8 and/or computing devices that possess other components that are not shown. Thus it should be appreciated that FIG. 8 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for generating and distributing diverse application instances performed by an application store system comprising a processor and a non-transitory computer-readable storage medium storing instructions that, when executed, cause the application store system to perform the method, the method comprising:
   receiving an intermediate representation of an application from an application developer system;
   receiving a request from a user device to download the application from the application store system, the request comprising unique information provisioned to the user device by a personalization service;
   generating an instance of the application, wherein generating the instance of the application comprises:
      embedding data in the intermediate representation of the application, the embedded data being unique to the instance of the application and being generated by the application store system based, at least in part, on the unique information provisioned to the user device, and
      performing a backend compilation of the intermediate representation of the application with the embedded data by the application store system to generate the instance of the application; and
   transmitting the instance of the application to the user device in response to the request.

2. The method of claim 1, wherein generating the instance of the application further comprises embedding code in the application unique to the instance of the application.

3. The method of claim 2, wherein the code is embedded in a subcomponent of the application.

4. The method of claim 1, wherein the embedded data is embedded in a subcomponent of the application.

5. The method of claim 1, wherein the embedded data comprises at least one of a key, a nonce, and random salt data.

6. The method of claim 1, wherein the intermediate representation of the application comprises first obfuscated bitcode of the application.

7. The method of claim 1, wherein the unique information provisioned to the user device comprises a key.

8. The method of claim 1, wherein the unique information provisioned to the user device comprises at least one of user account, registration, and authentication data.

9. The method of claim 1, wherein generating the instance of the application is performed in response to receiving the request.

10. The method of claim 1, wherein the unique information provisioned to the user device comprises device identification information unique to the user device.

* * * * *